US011479377B2

(12) United States Patent
Jeschke et al.

(10) Patent No.: US 11,479,377 B2
(45) Date of Patent: Oct. 25, 2022

(54) CAPSULE FILLING MACHINE FOR FILLING CAPSULES, AND CLEANING UNIT FOR A CAPSULE FILLING MACHINE

(71) Applicant: Harro Hoefliger Verpackungsmaschinen GmbH, Allmersbach im Tal (DE)

(72) Inventors: Michael Jeschke, Allmersbach im Tal (DE); Jonas Hoepfer, Allmersbach im Tal (DE); Thomas Puppich, Allmersbach im Tal (DE); Uwe Kiehn, Allmersbach im Tal (DE); Andreas Lux, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 350 days.

(21) Appl. No.: 16/432,605

(22) Filed: Jun. 5, 2019

(65) Prior Publication Data

US 2019/0367201 A1 Dec. 5, 2019

(30) Foreign Application Priority Data

Jun. 5, 2018 (EP) .................................... 18176035
May 17, 2019 (EP) .................................... 19175015

(51) Int. Cl.
*B65B 55/24* (2006.01)
*A61J 3/07* (2006.01)
*B08B 1/00* (2006.01)

(52) U.S. Cl.
CPC ............... *B65B 55/24* (2013.01); *A61J 3/074* (2013.01); *B08B 1/002* (2013.01)

(58) Field of Classification Search
CPC . B65B 55/24; B65B 2210/06; B65B 2210/08; B65B 57/10; B65B 55/12;
(Continued)

(56) References Cited

U.S. PATENT DOCUMENTS

| 2,732,987 A | 1/1956 | Moore |
| 3,024,582 A | 3/1962 | Merill |
| (Continued) | | |

FOREIGN PATENT DOCUMENTS

| CN | 202638813 U | 1/2013 |
| CN | 104546486 A | 4/2015 |
| (Continued) | | |

OTHER PUBLICATIONS

English translation and office action of the Chinese Patent Office dated Mar. 31, 2022 in corresponding Chinese application No. 201910494510.1.

*Primary Examiner* — Anna K Kinsaul
*Assistant Examiner* — Luis G Del Valle
(74) *Attorney, Agent, or Firm* — Walter Ottesen, P.A.

(57) ABSTRACT

A capsule filling machine for filling capsules and a cleaning unit for use in a capsule filling machine are disclosed. The capsule filling machine includes at least two processing paths with a plurality of processing stations. One of the processing stations includes a cleaning unit. The cleaning unit has, for each of the at least two processing paths, a leadthrough path with a longitudinal axis for leading through capsules. At least one cleaning element for cleaning the capsules is arranged on each leadthrough path.

13 Claims, 6 Drawing Sheets

(58) Field of Classification Search
CPC ......... B65B 37/02; B65B 35/12; B65B 5/103;
B65B 31/02; B65B 55/02; B65B 55/10;
B65B 55/18; B65B 55/19; A61J 3/074;
B08B 1/002
USPC .................................. 53/403, 425, 510, 432
See application file for complete search history.

(56) References Cited

U.S. PATENT DOCUMENTS

| | | | | |
|---|---|---|---|---|
| 4,058,868 A | * | 11/1977 | Champion | B08B 7/04 |
| | | | | 15/3.16 |
| 4,266,477 A | * | 5/1981 | Ackley | B41F 17/36 |
| | | | | 198/380 |
| 6,741,731 B1 | * | 5/2004 | Yamamoto | G01N 21/9508 |
| | | | | 382/141 |
| 7,792,247 B2 | | 9/2010 | Schmied et al. | |
| 9,170,213 B2 | | 10/2015 | Runft et al. | |
| 2004/0149769 A1 | * | 8/2004 | Gamberini | A61J 3/074 |
| | | | | 221/167 |
| 2007/0028560 A1 | * | 2/2007 | Gauthier | B65B 55/24 |
| | | | | 53/167 |
| 2007/0042693 A1 | | 2/2007 | Saikin | |
| 2008/0219803 A1 | * | 9/2008 | Runft | G01G 17/00 |
| | | | | 414/800 |
| 2011/0016826 A1 | * | 1/2011 | Schmied | A61J 3/074 |
| | | | | 53/267 |
| 2011/0222993 A1 | * | 9/2011 | De Ruijter | G01N 21/9508 |
| | | | | 414/222.01 |
| 2013/0255833 A1 | * | 10/2013 | Runft | A61J 3/074 |
| | | | | 141/145 |
| 2014/0236349 A1 | * | 8/2014 | Bae | B65B 57/14 |
| | | | | 700/236 |

FOREIGN PATENT DOCUMENTS

| | | | |
|---|---|---|---|
| CN | 105055170 A | | 11/2015 |
| CN | 205459914 U | | 8/2016 |
| CN | 106363512 A | * | 2/2017 |
| CN | 106363512 A | | 2/2017 |
| CN | 206839824 U | | 1/2018 |
| DE | 102010038544 A1 | | 4/2011 |
| WO | 2006106012 A1 | | 10/2006 |

* cited by examiner

CAPSULE FILLING MACHINE FOR FILLING CAPSULES, AND CLEANING UNIT FOR A CAPSULE FILLING MACHINE

CROSS REFERENCE TO RELATED APPLICATION

This application claims priority of European patent application no. 18 176 035.6, filed Jun. 5, 2018, and European patent application no. 19 175 015.7, filed May 17, 2019 and the entire content of which is incorporated herein by reference.

FIELD OF THE INVENTION

The invention relates to a capsule filling machine for filling capsules and to a cleaning unit for use in a capsule filling machine.

BACKGROUND OF THE INVENTION

Capsules which are intended to be swallowed are filled with a selected filler in capsule filling machines. Capsules of this kind can be produced, for example, from hard gelatin or the like. In this case, the capsules have a bottom part and a top part which is mounted on the bottom part. In order to be filled with a filler, the capsule parts which are initially loosely placed one on the other are separated from one another and closed again after the filling process. The filler can be in the form of powder, granules, tablets or the like. Capsules of this kind are used, in particular, in the pharmaceutical sector but also in the field of food supplements or the like.

The capsules pass through the above-described process steps on a so-called processing path. If the capsule filling machines include a plurality of processing paths, simultaneous processing of a plurality of capsules is possible. During the processing process, the capsules do not change their respective processing path. As long as the capsule can be associated with the processing path, the processing information can also be associated with the capsule of the respective processing path. If, in the process, there are deviations between the measured real values and the pre-specified setpoint values, the machine operator can intervene in the process for regulation purposes.

After the process of filling the capsules, it may be necessary to clean the capsules since the outside of the capsules is exposed to dust as a result of being filled with the dry and granular filler. In the case of known capsule filling machines, separate capsule dedusters which are arranged outside the capsule filling machine are provided for this purpose. After the filling process, the capsules leave their separate processing paths and are jointly conveyed as bulk material from the capsule filling machine to the capsule deduster and cleaned there. One disadvantage of known capsule filling machines is that it is no longer possible to associate the capsules with their respective processing path after they have been cleaned. Furthermore, arrangements of this kind including the capsule filling machine and the deduster take up large regions of the production area and it is very costly to provide and accommodate the arrangements, particularly in cleanroom conditions in the pharmaceutical sector.

In order to protect the machine operator against highly active pharmaceutical active substances but also for particularly stringent requirements in respect of the cleanliness of the working environment, it may be necessary to carry out both the filling process and also the cleaning process of the capsules in a closed atmosphere. This closed atmosphere is called "containment" in technical jargon. In this case, the working region of the machine is virtually completely sealed off from the machine environment and also subject to a slight negative pressure in relation to the surrounding area. As a result, no dust particles, in particular no active substances, can pass from the containment into the area surrounding the machine. If, however, the active substances are not harmful to the machine operator, a containment can be dispensed with. Therefore, it suffices to provide a simple machine housing to protect against soiling of the surrounding working area. The known capsule dedusters used for cleaning are formed separately from the capsule filling machine and, in addition, are provided with their own containment if required. Capsule dedusters of this kind are very complex and costly on account of their complex construction, in particular so as to comply with increased safety requirements.

SUMMARY OF THE INVENTION

It is an object of the invention to provide a capsule filling machine for filling capsules in such a way that the capsule filling machine has a reduced installation space and at the same time it is also still possible to associate the capsules with the respective processing paths after the capsules are cleaned.

This object can, for example, be achieved by a capsule filling machine for filling capsules having at least two processing paths including a plurality of processing stations; one of the processing stations including a cleaning unit; the cleaning unit having, for each of the at least two processing paths, a leadthrough path for leading through capsules; each of the leadthrough paths defining a longitudinal axis; and, the cleaning unit having at least one cleaning element for cleaning the capsules arranged at each leadthrough path.

It is a further object of the invention to provide a cleaning unit which allows the capsules to be associated with the respective processing paths after the capsules are cleaned and renders possible simple removal of the cleaning unit.

This object can, for example, be achieved by a cleaning unit for a capsule filling machine defining at least two processing paths including a plurality of processing stations, one of the processing stations including the cleaning unit. The cleaning unit includes: a cleaning unit body defining, for each of the at least two processing paths, a leadthrough path for leading through capsules; each of the leadthrough paths defining a longitudinal axis; and, at least one cleaning element for cleaning the capsules arranged at each leadthrough path.

The capsule filling machine for filling capsules includes at least two processing paths with a plurality of processing stations. One of the processing stations includes a cleaning unit. The cleaning unit has, for each of the at least two processing paths, a respective leadthrough path with a longitudinal axis for leading through capsules. Accordingly, each processing path also includes a respective leadthrough path. At least one cleaning element for cleaning the capsules is arranged on each leadthrough path.

The capsule is conveyed through the leadthrough path during its processing process for cleaning in the cleaning unit. In the process, the cleaning element of the cleaning unit makes contact with the capsule and brushes off the dust particles located on the capsule. The capsule is cleaned of dust particles, in particular of active substances, by the cleaning element as the capsule passes through the leadthrough path. Since each processing path includes a leadthrough path, the capsules are separately cleaned along each processing path. Therefore, the capsules remain on their processing path during the cleaning operation. As a result, each capsule can be associated with the corresponding processing path even during or immediately after it is cleaned.

The position of the cleaning unit in relation to the various processing stations is not defined in principle. However, the cleaning unit is preferably to be positioned downstream of the filling station and in particular in the ejection station. Nevertheless, a different position of the cleaning unit in the process sequence can also be expedient. In addition, a plurality of cleaning units can also be advantageously provided in a capsule filling machine.

The capsules are usually subjected to quality control after cleaning. In the process, the weight of the capsules is measured, amongst other things. Since each capsule can be associated with its corresponding processing path, any processing deviations, such as errors in respect of the capsule weight for example, can also be allocated to a corresponding processing path. This allows the machine operator to perform rapid fault analysis in respect of whether the production deviations are systematic or merely random production deviations. If the fault is of a systematic nature, the machine operator can adjust the process settings of the corresponding processing path and quickly and easily eliminate the undesired production deviation.

The cleaning unit has comparatively small dimensions and is integrated in the capsule filling machine. If the capsule filling machine forms a containment, the cleaning element is also located in the containment of the capsule filling machine. Owing to the cleaning unit, a conventional capsule deduster, which is arranged separately from the capsule filling machine as a stand-alone solution in the prior art, can be dispensed with. Accordingly, the installation space required for this purpose up until now is dispensed with according to the disclosure, while the capsule filling machine according to the disclosure does not take up a relatively large amount of installation space or takes up at most only a relatively slightly large amount of installation space.

In order to clean the cleaning unit, the cleaning unit can be removed. On account of the comparatively small dimensions, the cleaning unit can optionally be cleaned in an industrial washer, and accordingly complex manual cleaning is then no longer necessary. Furthermore, the cleaning unit can also be simply replaced by a new cleaning unit. The used cleaning unit can either be disposed of or cleaned and reused.

The cleaning element is advantageously configured as a brush with bristles, where the bristles protrude, by way of their free ends, inward into the leadthrough path. As the capsules are led through the leadthrough channel, the bristles make contact with the capsule by way of their free ends. As the capsule moves through the leadthrough channel, the bristles, by way of their free ends, that is, by way of the tips of the bristles, brush the dust particles from the capsule. The bristles can preferably also have different bristle lengths and protrude to various depths into the leadthrough channel. In this way, the bristle lengths can be matched to the shape and size of the capsule and render it more easily possible to reach the capsule surface. In an alternative embodiment, the cleaning element can preferably also be configured as lugs or as a wipe-off element composed of foam, silicone, stainless steel or the like. A combination of brushes with the lugs and/or the wipe-off elements can also be expedient in the cleaning unit.

At least one first brush and one second brush are preferably arranged on each leadthrough path. The contact area, including the free ends of the bristles and the capsule surface, can also be increased by increasing the number of brushes. As a result, the capsule can be cleaned more effectively and more thoroughly. The first brush and the second brush are preferably arranged offset in relation to one another in the circumferential direction of the longitudinal axis of the leadthrough path. As a result, a larger region of the capsule surface can be reached by the bristles, so that the capsule surface can be cleaned substantially along its entire circumference. In this case, the bristles of the brushes which are arranged offset in relation to one another are oriented in different directions. The first brush and the second brush are advantageously arranged offset in relation to one another in the direction of the longitudinal axis of the leadthrough path.

In an advantageous embodiment of the capsule filling machine, at least one and, in particular, one first and one second brush which are arranged on the leadthrough path are driven in rotation about their respective rotation axis. In this case, the dust particles are not only wiped from the capsule downward in the direction of the longitudinal axis of the leadthrough path but rather also transversely in relation to the longitudinal axis of the leadthrough path. As a result, the rotating brushes can remove the dust particles from the capsule very thoroughly and quickly. Owing to the transverse movement of the bristles, projections from the capsule surface in particular can be efficiently cleaned. Furthermore, the rotation axis of the at least one brush can preferably run obliquely in relation to the longitudinal axis of the respective leadthrough path. As a result, the capsule is cleaned by the free ends of the bristles and pushed along the leadthrough channel as the brush rotates. Therefore, the obliquely positioned brush serves as a cleaning element and, at the same time, as a conveying means for the capsule.

Provision is advantageously made for the cleaning unit to have a compressed-air feed on the leadthrough path for providing compressed air and to have a compressed-air outlet for blowing out the compressed air. The compressed air is blown into the leadthrough path via the compressed-air feed. In the process, dust particles are blown from the capsule surfaces and from the cleaning elements. The air which is then contaminated with dust particles is blown out of the compressed-air outlet together with the compressed air. The compressed-air feed is preferably configured as a gap opening on the leadthrough path. The compressed air is concentrated through the gap opening and blown at a comparatively high speed against the capsule surface in a targeted manner, as a result of which the dust particles should be more effectively detached from the capsule surface. Permanent thorough cleaning of the cleaning unit is rendered possible by the continuous exchange of compressed air via the compressed-air feed and the compressed-air outlet.

When filling the capsules, foreign bodies can enter the capsules. Foreign bodies of this kind can be composed of plastic or metals for example and these can be harmful when consumed by humans. Therefore, it is necessary to prevent tablets containing foreign bodies entering the market. To this end, foreign body detection apparatuses which check the capsules for foreign bodies after they have been output from the capsule filling machine are used. If a foreign body is located in a capsule, the capsule is rejected. Foreign body detection apparatuses of this kind are known as stand-alone solutions in the prior art and, in addition to the capsule filling machine, additionally take up expensive production area. According to an aspect the invention, provision can be made for the capsule filling machine to include a foreign body detection apparatus for identifying foreign bodies in the capsules, that is, in other words, the foreign body detection apparatus is physically and functionally integrated into the capsule filling machine. As a result, production area can be saved, and the operating costs incurred for filling capsules can be reduced.

The foreign body detection apparatus preferably has, for each of the at least two processing paths of the capsule filling machine, a respective identification path for leading through capsules. A detecting unit is advantageously provided on the identification paths. The detecting unit is used to check each capsule for foreign bodies as it passes through the identification path. Each capsule remains on its processing path in the process. Each capsule can also be associated with the corresponding processing path during or immediately after being checked for foreign bodies. The foreign body detection apparatus is preferably fitted downstream of the cleaning unit. As a result, each capsule can be associated with the corresponding processing path after the cleaning operation and after the foreign body detection operation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
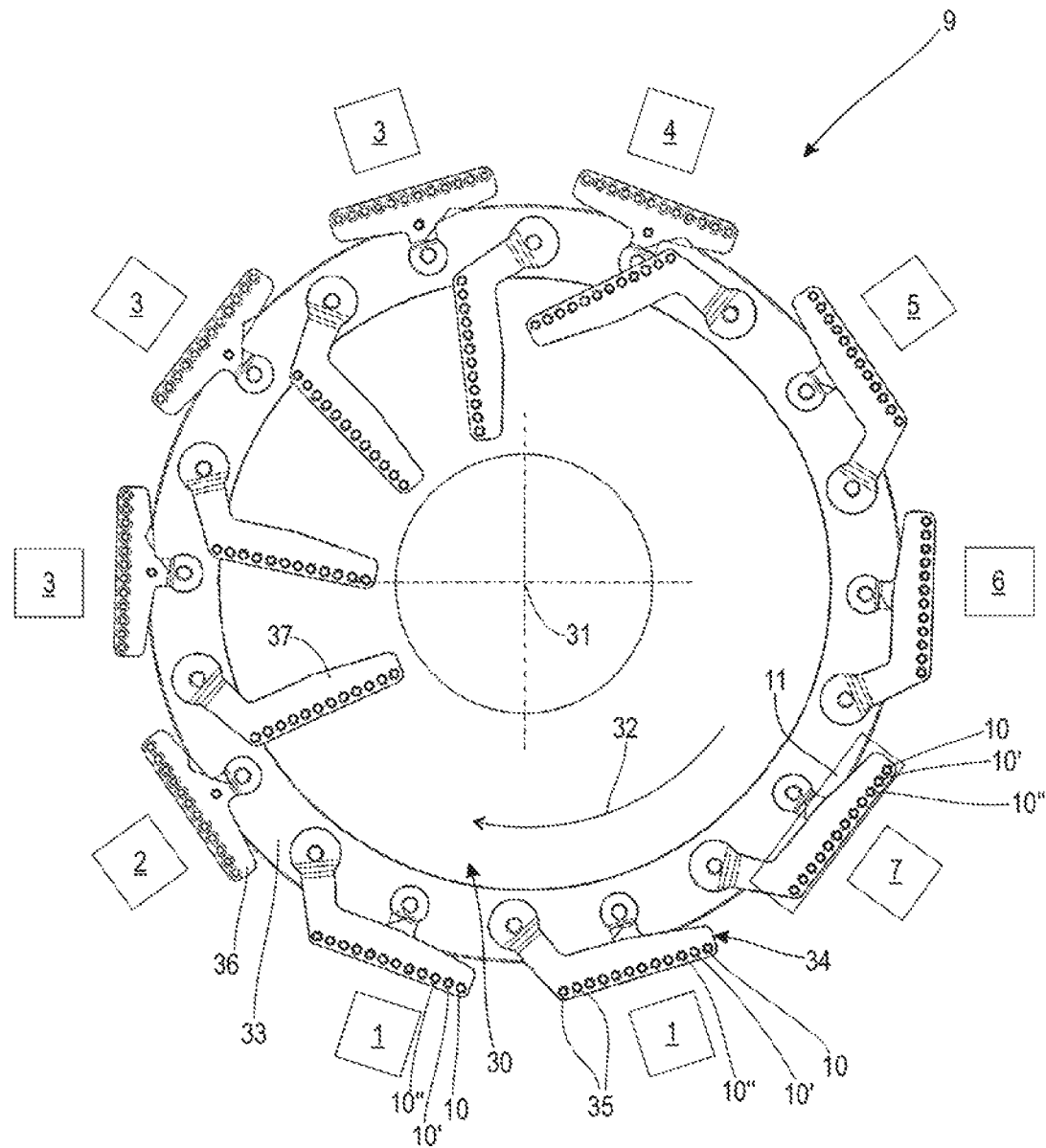
FIG. 1 shows a plan view of the rotary table of a capsule filling machine which is configured according to an embodiment of the disclosure and has a single-row capsule receptacle and schematically illustrated processing stations.

FIG. 1 shows a plan view of the central part of a capsule filling machine, which is configured according to an embodiment of the invention, for filling capsules 12 (FIG. 2) with a filler. The filler can be provided in the form of a powder, granules, tablets or the like. In this case, the filler may be a pharmaceutical preparation or a food supplement. The capsules 12 consist of a capsule bottom part 28 and a capsule top part 29 which is mounted on the bottom part (FIG. 6), the two parts being produced, for example, from hard gelatin.

The capsule filling machine 9 according to FIG. 1 includes a rotary table 30 which can be driven in rotation about a vertical rotation axis 31 following an arrow 32 in clocked steps. A number of capsule receptacles 34 are arranged at uniform angular distances on a circumferential region 33 of the rotary table 30. In the embodiment shown, a total of ten capsule receptacles 34 are provided. However, a different number may also be expedient. In the preferred embodiment shown, the capsule receptacles 34 contain a row of receiving pockets 35 for receiving the capsules 12. A plurality of rows of receiving pockets 35 may also be expedient.

It is clear from FIG. 1 that each capsule receptacle 34 consists of a respective bottom part receptacle 36, which is fixedly fastened to the circumferential region 33 of the rotary table 30, and also a top part receptacle 37 which can be pivoted relative to the bottom part receptacle. A plurality of stationary processing stations, that is, processing stations which do not rotate together with the rotary table 30 and which are illustrated only schematically and not in detail, are positioned around the rotary table 30. The number of processing stations corresponds to the number of capsule receptacles 34, so that each capsule receptacle 34 comes to a stop in the access region of a respective processing station in each rotary position, which is clocked in angular steps, of the rotary table 30.

According to the preferred embodiment shown, the two first processing stations are each an insertion and separation station 1 in which temporarily assembled empty capsules which consist of a capsule bottom part 28 and a capsule top part 29 are inserted into the row of receiving pockets 35, wherein the mounted capsule top part 29 is then also separated from the capsule bottom part 28. The next processing station is a segregation station 2. At the transition from the second insertion and separation station 1 to the segregation station 2, the top part receptacle 37 with the capsule top parts 29 held therein is pivoted in relation to the bottom part receptacle 36 with the capsule bottom parts 28 held therein. Faulty empty capsules which have not been separated are segregated in the segregation station 2.

Here, a total of three filling stations 3, in which the capsule bottom parts 28 which are held in the bottom part receptacles 36 are filled with the intended filler, follow the segregation station 2. It may be sufficient to provide only one or two filling stations. The arrangement of a plurality of, here a total of three, filling stations 3 allows the capsule bottom parts 28 in a row of receiving pockets 35 to be filled, where filling with different fillers can also be provided as an option.

After passing through the last filling station 3, the top part receptacle 37 is pivoted back into the aligned position relative to the bottom part receptacle 36 in a pivoting-in station 4. In the following closing station 5, the capsules 12 are closed by way of the previously withdrawn or separated capsule top parts 29 being pushed back onto the filled capsule bottom parts 28 and locked in place. A monitoring station 6 follows the closing station 5. In the monitoring station 6, capsules 12 which have been checked and found to be bad are ejected. In a following ejection station 7, the remaining capsules 12 which have been found to be good are ejected via tappets, not illustrated, or other ejection means. When ejected, the capsules 12 are conveyed through a cleaning unit 11, only schematically indicated here and described in more detail further below, and then supplied for further processing. However, it may also be expedient to provide the cleaning unit 11 at another point, in particular at another station or additionally to integrate one or more independent cleaning stations with a cleaning unit 11 of this kind into the capsule filling machine 9.

Each capsule 12 is guided through the processing stations along a so-called processing path 10, 10', 10". A processing path 10, 10', 10" of this kind is the result of the positioning of the capsules 12 in the individual processing stations. This positioning is already defined in the insertion and separation station 1 by the insertion of the capsule 12 into the receiving pocket 35 of the capsule receptacle 34. Therefore, the number of processing paths 10, 10', 10" corresponds to the number of receiving pockets 35 which are provided in the capsule receptacles 34. In the preferred embodiment, the capsule filling machine 9 has twelve processing paths 10, 10', 10" in a manner corresponding to the number and position of the receiving pockets 35. A different number of processing paths 10, 10', 10" may also be expedient. The capsules 12 maintain their positioning during the processing processes, that is, the capsules 12 are not mixed with capsules 12 of other processing paths 10, 10', 10" during processing. As a result, it is possible for each capsule 12 to be able to be associated with an individual processing path 10, 10', 10". This is referred to as "path-related" processing in technical jargon.

Accordingly, the cleaning unit 11 of the capsule filling machine 9 is configured in such a way that path-related processing of the capsules 12 is performed until immediately after the capsules are cleaned in the cleaning unit 11. After ejection from the ejection station 7, the capsules 12 are combined for further processing, so that the further processing of the capsules 12 is not path-related. In an alternative embodiment of the capsule filling machine 9 however, the capsules 12 are ejected in a path-related manner, so that the processing steps which follow the cleaning of the capsules 12 in the cleaning unit 11, such as weighing the capsule weight for example, can also be performed in a path-related manner.

The description of the processing stations provided here serves only as an example. It is also possible to provide other processing stations with other tasks and/or in another number. In each case, the capsule filling machine 9 includes at least one cleaning unit 11, the configuration of the cleaning unit being described below in connection with FIGS. 2 to 9.

Figure 2:
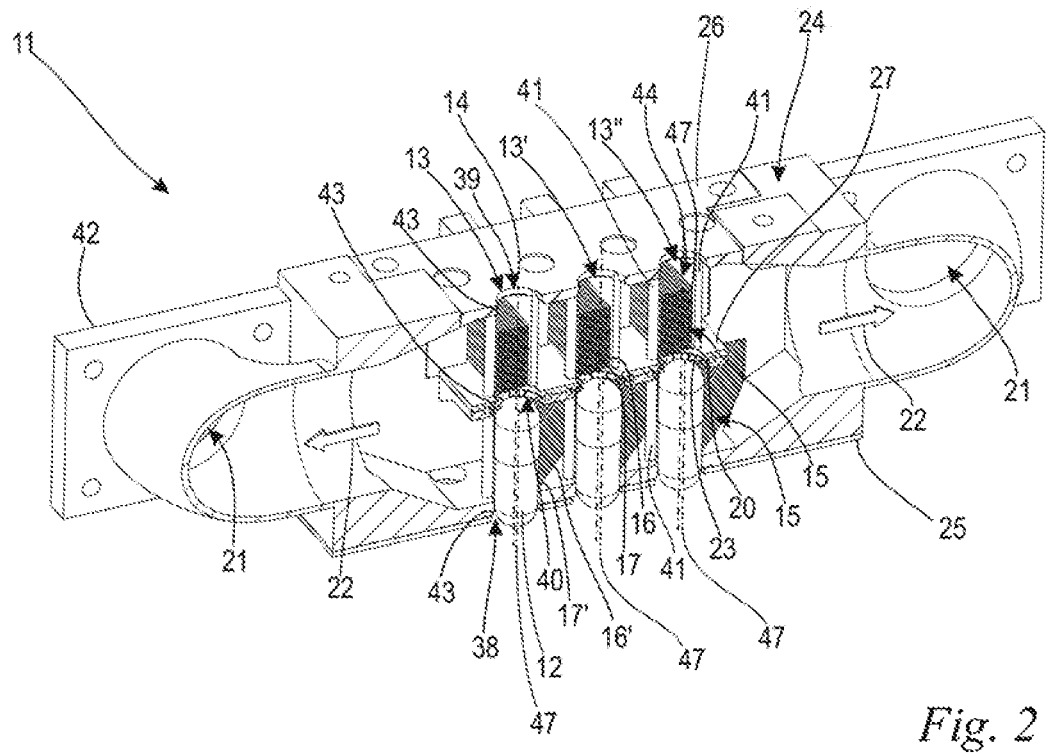
FIG. 2 shows a perspective illustration of a cleaning unit for use in a capsule filling machine.

FIG. 2 shows a cleaning unit 11 which is configured according to an embodiment of the invention and is provided in the capsule filling machine 9 in one of the stations, in the ejection station 7 according to FIG. 1. The cleaning unit 11 includes a housing 24 which has a housing bottom side 25, a housing top side 26 and a housing rear side 42. The housing bottom side 25 and the housing top side 26 are approximately perpendicular in relation to the housing rear side 42 and are connected to one another by the housing rear side. In addition, an intermediate wall 27 is formed between the housing bottom side 25 and the housing top side 26 in the housing 24 of the cleaning unit 11. The intermediate wall 27 is supported in relation to the housing bottom side 25 and the housing top side 26 via connecting webs 41.

As shown in FIG. 2, the cleaning unit 11 includes leadthrough paths 13, 13', 13" which each extend from a first opening 38 on the housing bottom side 25, via an intermediate opening 40 on the intermediate wall 27, to a second opening 39 on the housing top side 26. In the embodiment, the openings 38, 39, 40 are round and, by way of their diameter, delimit the leadthrough path 13. In addition, the openings 38, 39, 40 are each provided with a chamfer 43 which centers the capsule 12 as it is moved through the leadthrough path 13. The leadthrough path 13 is delimited by the connecting webs 41 between the housing bottom side 25, the intermediate wall 27 and the housing top side 26. Accordingly, the connecting webs 41 serve both for supporting the intermediate wall 27 on the housing bottom side 25 and the housing top side 26 and also for guiding the capsule 12. The leadthrough path 13 is oriented in the cleaning unit 11 in such a way that its longitudinal axis 14 is approximately perpendicular in relation to the housing bottom side 25, in relation to the intermediate wall 27 and in relation to the housing top side 26.

The number of above-described leadthrough paths 13, 13', 13" depends on the number of processing paths 10 which are provided in the capsule filling machine 9. In the embodiment according to FIG. 2, only three leadthrough paths 13, 13', 13" are provided. According to the capsule filling machine 9 according to FIG. 1, twelve processing paths 10 would also require twelve leadthrough paths 13 in order to be able to ensure path-related processing of the capsules 12 even after cleaning.

Figure 3:
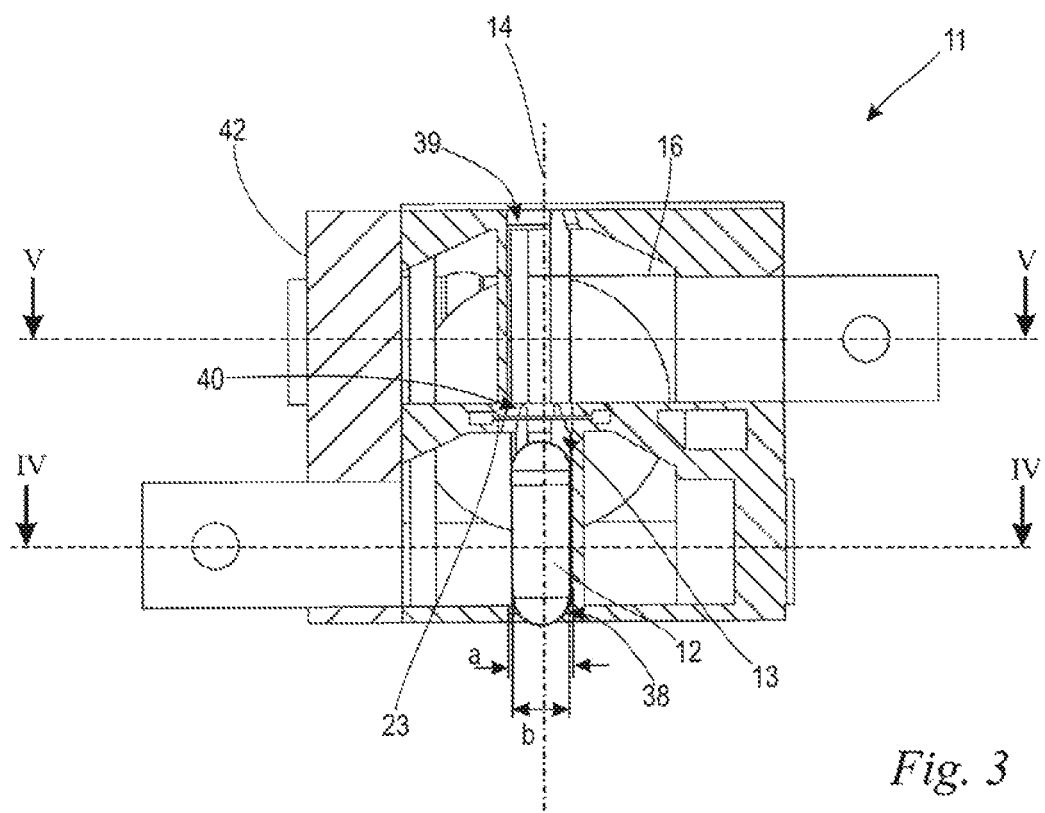
FIG. 3 shows a sectional illustration of an embodiment of the cleaning unit.
Figure 4:
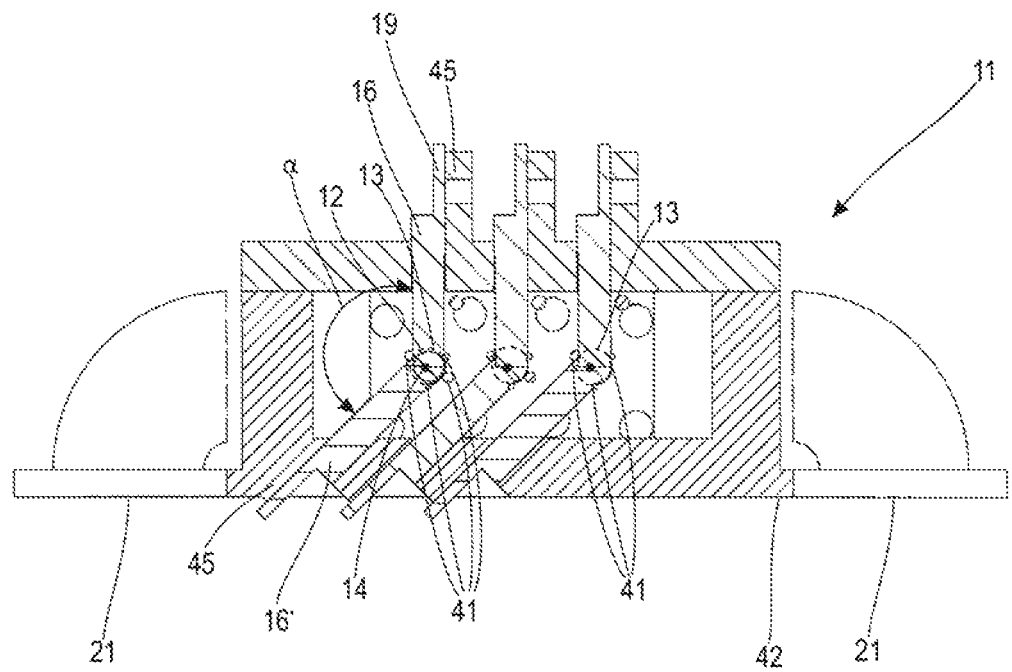
FIG. 4 shows a sectional illustration of the cleaning unit along the line IV-IV in FIG. 2.

As shown in FIG. 2, the cleaning unit 11 includes cleaning elements 15. In the embodiment, the cleaning elements 15 are configured as brushes 16 with a large number of bristles 17. The brushes 16 are fastened, at their brush shaft 19, to the housing 24 of the cleaning unit 11 (FIG. 3). It may be expedient to provide a screw arrangement as the brush fastening arrangement, as a result of which the brushes 16 can be detached from the housing 24 again and replaced if necessary. The brushes are arranged in such a way that their bristles 17 protrude, by way of their free ends 44, into the leadthrough path 13. As shown in FIGS. 3 and 4, four brushes 16, 16' (FIGS. 3 to 5) are provided on each leadthrough path 13. A first pair of brushes 16, 16' is arranged between the housing bottom side 25 and the intermediate wall 27, and a second pair of brushes 16, 16' is arranged between the intermediate wall 27 and the housing top side 26. The brushes 16, 16' of a pair of brushes are each arranged offset in relation to one another in the circumferential direction of the longitudinal axis 14. The two pairs of brushes themselves are arranged offset in relation to one another in the direction of the longitudinal axis 14 of the leadthrough path 13.

In order to clean the capsule 12, the capsule is pushed through the leadthrough path 13 via a pusher element, not shown. Given the preferred positioning of the cleaning unit 11 in the ejection station 7 according to FIG. 1, the ejection tappets used there serve as the abovementioned pusher elements. In the process, the capsule 12 is first pushed through the first opening 38 of the housing bottom side 25 and past the first pair of brushes. In the process, the brushes 16, 16', by way of their free ends 44, make contact with the capsules 12 and wipe down the dust particles from the capsule surface. The capsule 12 is pushed further through the intermediate opening 40 of the intermediate wall 27 and past the second pair of brushes 16, 16'. Since the second pair of brushes 16, 16' is arranged offset in relation to the first pair of brushes in the circumferential direction of the longitudinal axis 14, the dust particles on the as yet uncleaned surfaces of the capsule 12 are also wiped off by the second pair of brushes 16, 16'. The capsule 12 is pushed further through the second opening 39 on the housing top side 26 and, in the cleaned state, provided for further processing in the capsule filling machine 9. Therefore, the capsules 12 can be supplied, for example, via individual, path-related chutes to a monitoring station in which, for example, the weight of the capsules 12 is detected. Furthermore, in the case of deviations from the setpoint values, if the errors can be attributed to the filling quantity of the capsules 12 for example, the corresponding filling station can be readjusted. The cleaning in the cleaning station 11 renders possible path-related cleaning, so that a fault can be found in a quick and simple manner even after cleaning of the capsule. In an alternative embodiment of the cleaning unit 11, the capsule 12 is not pushed fully upward out of the second opening 39 of the capsule top side 26 for further processing, but rather is pushed back again through the first opening 38 after being wiped off by the brushes 16, 16' and even provided to the housing bottom side 25 for further processing. If the cleaning unit 11 is not positioned in the ejection station 7 but rather in front of it, pushing the capsule back downward can also be used to convey the cleaned capsules back into the associated receiving pockets 35 such that they retain their respective processing paths 10, 10', 10". The leadthrough path 13 is configured in such a way that, as the capsule 12 passes through the leadthrough path 13, the capsule 12 is oriented with its longitudinal axis 47 parallel, in particular coaxial, in relation to the longitudinal axis 14 of the leadthrough path 13. However, it may also be expedient to configure the leadthrough path 13 in such a way that, as the capsule 12 passes through the leadthrough path 13, the capsule 12 is oriented with its longitudinal axis 47 transverse in relation to the longitudinal axis 14 of the leadthrough path 13.

As shown in FIG. 2, the cleaning unit 11 includes a compressed-air feed 20 for providing compressed air 22. In the embodiment, the compressed-air feed 20 is configured as a gap opening 23 in the intermediate opening 40 of the intermediate wall 27. As the capsules 12 are pushed past the intermediate wall 27, compressed air 22 is blown onto the capsules 12. As a result, the dust particles can be blown off the capsules 12, as a result of which cleaning of the capsules 12 is assisted. The compressed air 22 can escape again at a compressed-air outlet 21 which is provided in the housing 24. Permanent air exchange takes place owing to the circulation of the compressed air 22 from the compressed-air feed 20 via the compressed-air outlet 21. The cleaning unit 11 can additionally include a suction-removal arrangement, not shown in FIG. 2. The suction-removal arrangement actively sucks, for example using a fan, the compressed air 22 out of the cleaning unit 11 via the compressed-air outlet 21, and in this way assists in exchanging the compressed air 22. As a result, the air which is contaminated with dust particles is blown out of the cleaning unit 11, so that the cleaning unit 11 is continuously cleaned. In addition, the compressed air 22 renders possible additional cleaning of the cleaning elements 15, in particular of the brushes 16, 16'.

In the embodiment, the cleaning unit 11 is produced from a plastic material by injection molding. Owing to the associated low production costs, the cleaning unit 11 is configured as a disposable part. It may also be expedient to produce the cleaning unit 11 from valuable materials, in particular from metals, preferably stainless steels, and to reuse these after cleaning, for example in an industrial washer.

FIG. 3 shows a sectional illustration of a cleaning unit 11 which is configured according to an embodiment of the invention, wherein the sectional plane runs along the longitudinal axis 14 of the leadthrough path 13 and is approximately perpendicular in relation to the housing rear side 42 of the cleaning unit 11. As shown in FIG. 3, the leadthrough path 13 has a minimum diameter a which is given by the diameter of the openings 38, 39, 40 in the embodiment. The capsule 12 has a diameter b which is smaller than the diameter a of the leadthrough path 13. This ensures that the capsule 12 can be pushed through the leadthrough path 13 without significant deformation and is not damaged.

FIG. 4 shows the cleaning unit 11 in a sectional illustration between the housing bottom part 25 and the intermediate wall 27. It is clear from the illustration that in each case two brushes 16, 16' form a pair of brushes which are offset in the circumferential direction of the longitudinal axis 14.

Figure 5:
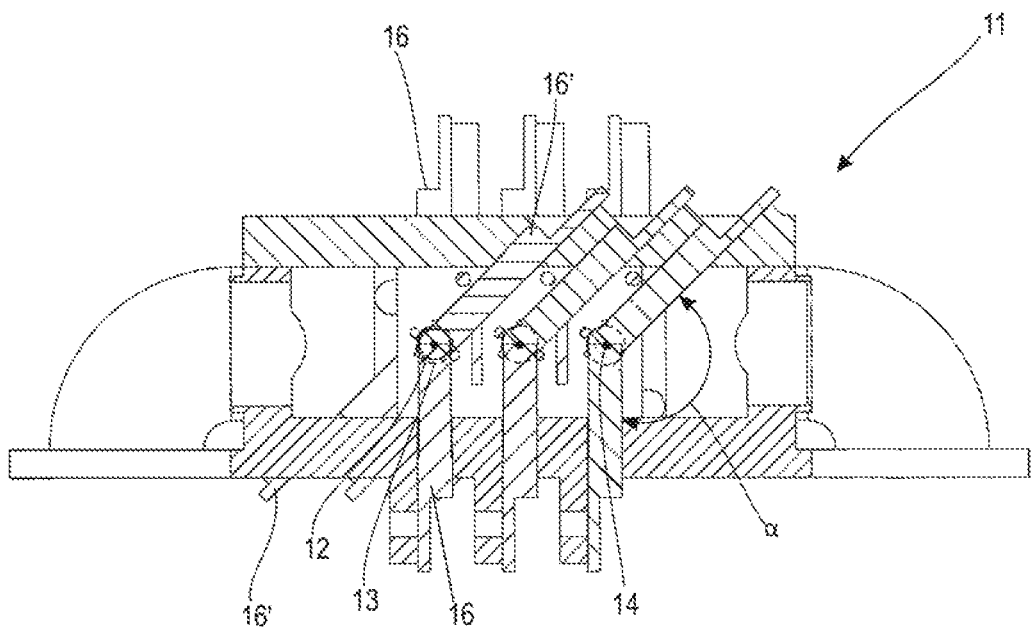
FIG. 5 shows a sectional illustration of the cleaning unit along the line V-V in FIG. 2.

In this case, the brushes 16, 16' enclose an angle α which is preferably less than 180°, in particular less than 150°, preferably approximately 130°. The brushes 16, 16' are fastened, at their brush shaft 19, to the brush receptacles 45 which are formed on the housing 24. The sectional illustration shown in FIG. 5 shows the cleaning unit 11 in a sectional plane between the intermediate wall 27 and the housing top part 26. As shown in FIG. 5, the second pair of brushes is likewise formed from two brushes 16, 16' which are arranged offset in relation to one another in the circumferential direction of the longitudinal axis 14. The brushes 16, 16' of the second pair of brushes likewise enclose an angle α. It can be clearly seen in FIG. 5 that the first pair of brushes is arranged offset in relation to the second pair of brushes both in the circumferential direction of the longitudinal axis 14 and also in the direction of the longitudinal axis 14. As a result, the brushes 16, 16' are arranged on the leadthrough path 13 such that their bristles 17 can make contact with and clean the entire surface of the capsule 12.

In addition, it can be clearly seen in FIGS. 4 and 5 that the distances between the connecting webs 41 of a leadthrough path 13 are large enough that the bristles 17, 17' of the brushes 16, 16' can be arranged between the connecting webs 41 and therefore protrude into the leadthrough path 13. Furthermore, the distance between the connecting webs 41 is so small that the capsule 12 is supported by the connecting webs 41 during cleaning and, in the process, the capsules 12 are prevented from being pushed out of the leadthrough path 13.

Figure 6:
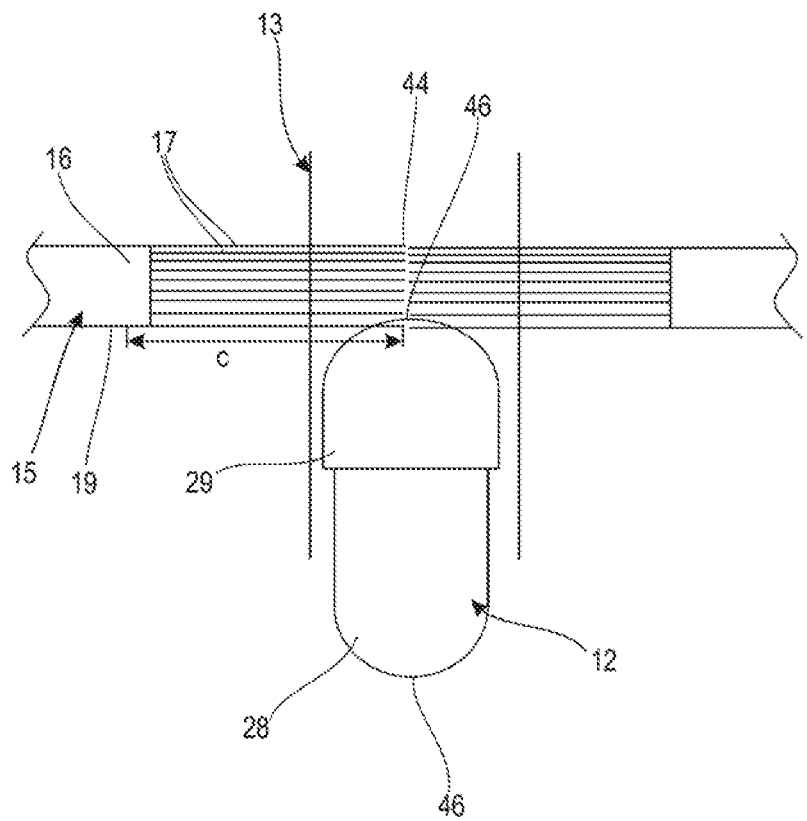
FIG. 6 and FIG. 7 show schematic sectional illustrations of embodiments of the cleaning unit with passive brushes.
Figure 7:
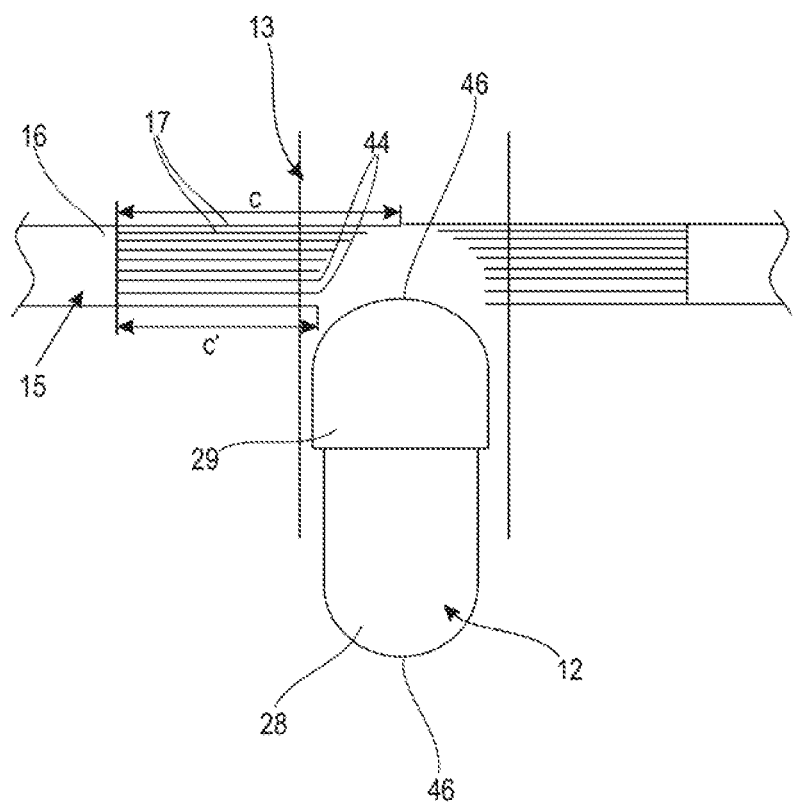

FIG. 6 shows a schematic illustration of a passive cleaning element 15. The passive cleaning element 15 is configured as a stationary brush 16. The brush 16 is arranged in relation to the leadthrough path 13 such that its bristles 17, at the free ends 44, protrude into the leadthrough path 13 and, as the capsule 12 is led through, are touched by the capsule. In the embodiment of FIG. 6, the bristles 17 of the brush 16 have the same length c. In an alternative embodiment according to FIG. 7, the bristles 17 of the brush 16 have different lengths c, c'. In this case, the long bristles 17 protrude into the leadthrough path 13 to such an extent that they make contact with and clean the end sides 46 of the capsule 12. The short bristles 17 however are only long enough for the bristles 17 to make contact with the capsule surface substantially only by way of their free ends but not by way of their longitudinal sides. It has been found that the dust particles can be wiped off from the capsule surface more effectively in this way.

Figure 8:
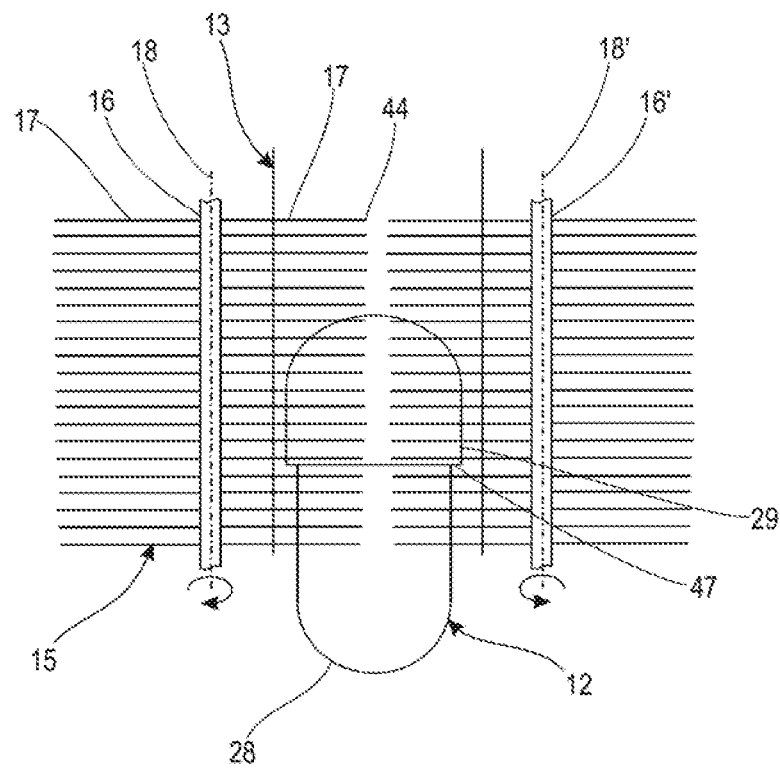
FIG. 8 and FIG. 9 show schematic sectional illustrations of embodiments of the cleaning unit with active, rotating brushes; and, FIG. 10 shows a perspective illustration of the cleaning unit according to FIG. 2 with a foreign body detection apparatus fitted downstream.

FIG. 8 shows a sectional illustration of an embodiment of the active cleaning elements 15. The cleaning elements 15 are configured as rotating brushes 16, 16'. The brushes 16, 16' are arranged in the cleaning unit 11 in such a way that their rotation axes 18, 18' run parallel in relation to the longitudinal axis 14 of the leadthrough path 13. The brushes 16, 16' are driven in rotation about the rotation axis 18, 18' of the brushes 16, 16' by a drive unit, not illustrated. As a result, the bristles 17, 17' not only wipe off the dust particles from the capsule surface in the longitudinal direction but rather also in the transverse direction in relation to the leadthrough path 13. The capsule top part 29 and the capsule bottom part 28 form, at their transition, a capsule projection 47 which is particularly difficult to clean. Owing to the bristles 17, 17' of the rotating brushes 16, 16', which bristles move in the transverse direction, a better cleaning result can be achieved at the capsule projection 47 in particular. In the embodiment, two rotating brushes 16, 16' are arranged on the leadthrough path 13. A different number of rotating brushes 16, 16' can also be expedient. In the embodiment, the brushes 16, 16' have different directions of rotation, so that rotation of the capsule 12 is substantially avoided.

Figure 9:
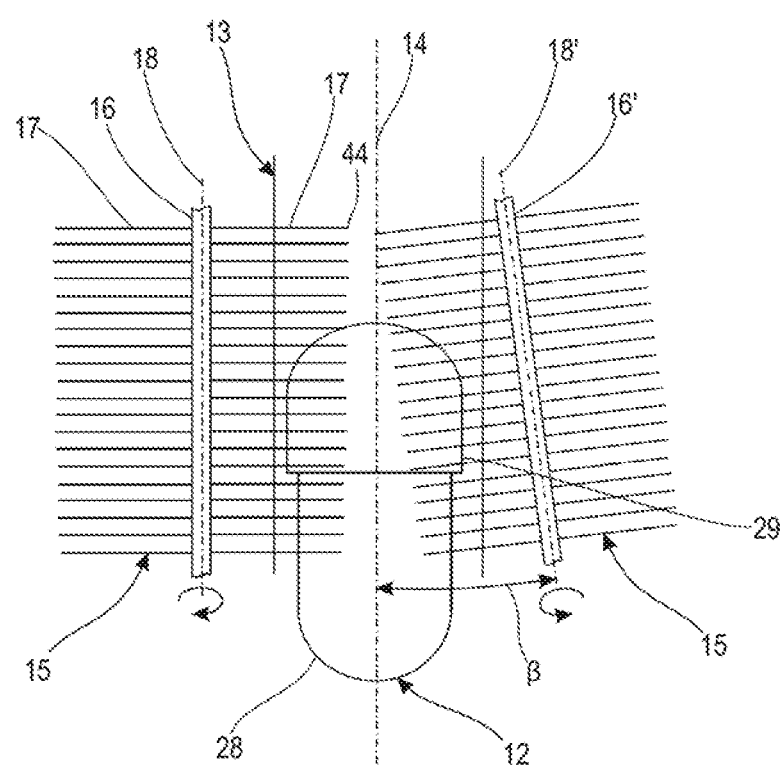

FIG. 9 shows an embodiment of the arrangement of the brushes 16, 16' according to FIG. 8. In this case, at least one of the brushes 16' runs obliquely in relation to the longitudinal axis 14 of the leadthrough path 13. It may also be expedient to arrange the second brush 16 or a plurality of brushes obliquely in relation to the longitudinal axis 14 of the leadthrough path 13. The rotation axis 18' of the brush 16' encloses an angle β with the longitudinal axis 14. The angle β is preferably at most 30°, in particular approximately 6°. Owing to the oblique position of the rotation axis 18' in relation to the leadthrough path 13, the brush 16' can convey the capsule 12 through the leadthrough path 13. As a result, the brush 16' serves both for cleaning and also for conveying the capsule 12. Therefore, conventional conveying means, such as capsule pushers, can be dispensed with.

Figure 10:
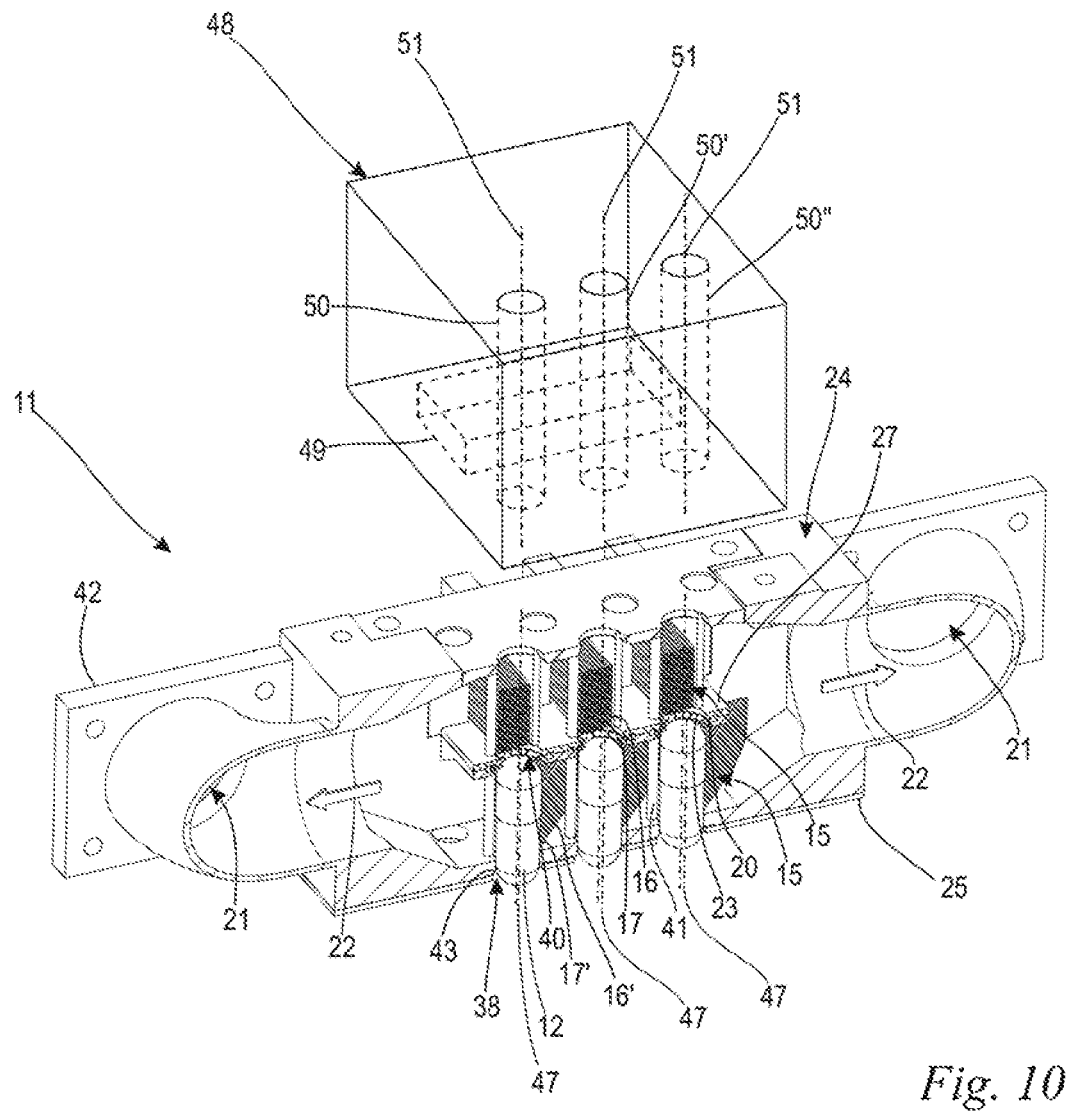

FIG. 10 shows a foreign body detection apparatus 48 which is integrated as an additional option into the above-described capsule filling machine 9. The foreign body detection apparatus 48 is fitted directly downstream of the cleaning unit 11. However, in an alternative embodiment, it may also be expedient to provide the foreign body detection apparatus 48 at a different point. The foreign body detection apparatus includes an identification path 50, 50', 50" for each of the processing paths 10, 10', 10" of the capsule filling machine 9. Three identification paths 50, 50', 50", each with a longitudinal axis 51, are shown in the preferred embodiment according to FIG. 10. When there is a different number of processing paths, it is necessary to correspondingly adjust the number of identification paths 50, 50', 50". The foreign body detection apparatus 48 includes a detecting unit 49 which is arranged on the identification paths 50, 50', 50". When checking the capsules 12 for foreign bodies, the capsules 12 are pushed through the identification paths 50, 50', 50" in the direction of their longitudinal axes 51. The capsules 12 are checked for foreign bodies as they pass the detecting unit 49. Inductive measurement field analysis is preferably used for this purpose. This measurement method has no influence on the filling material of the capsule 12 or on the capsule 12 itself. If a foreign body is detected in a capsule 12, the capsule is rejected. Path-related foreign body detection can be carried out in the capsule filling machine 9 via the integrated foreign body detection apparatus 48. In an alternative embodiment of the capsule filling machine 9, it may also be expedient to provide a non-path-related foreign body detection apparatus. A further inventive option additionally involves also using the foreign body detection apparatus 48 described here in a capsule filling machine 9, without the cleaning unit 11.

It is understood that the foregoing description is that of the preferred embodiments of the invention and that various changes and modifications may be made thereto without departing from the spirit and scope of the invention as defined in the appended claims.

What is claimed is:

1. A capsule filling machine for filling capsules, the capsule filling machine comprising:
   a plurality of processing stations;
   at least two processing paths guiding corresponding capsules through said plurality of processing stations;
   one of said processing stations including a cleaning unit;
   said cleaning unit having, for each of said at least two processing paths, a corresponding leadthrough path for leading through capsules;
   said leadthrough paths defining respective longitudinal axes,
   said cleaning unit having at least one cleaning element for cleaning the capsules arranged at each of said leadthrough paths;
   said at least two processing paths each being configured to enable a path-related processing of the capsules; and,
   said cleaning unit being configured to perform the path related processing until directly after the capsules are cleaned by the corresponding cleaning element.

2. The capsule filling machine of claim 1, wherein each of said cleaning elements is a brush with bristles, wherein said bristles each have a free end and protrude, by way of said free ends, inwardly into corresponding ones of said leadthrough paths.

3. The capsule filling machine of claim 2, wherein at least one first brush and one second brush are arranged at each leadthrough path.

4. The capsule filling machine of claim 3, wherein said first brush and said second brush are arranged offset in relation to one another in a circumferential direction of the longitudinal axis of said leadthrough path corresponding thereto.

5. The capsule filling machine of claim 3, wherein said first brush and said second brush are arranged offset in relation to one another in a direction of the longitudinal axis of said leadthrough path corresponding thereto.

6. The capsule filling machine of claim 2, wherein at least one brush arranged at said leadthrough path is driven in rotation about a rotation axis.

7. The capsule filling machine of claim 3, wherein:
   said first brush and said second brush each define a respective rotation axis; and,
   said first brush and said second brush are each configured to be rotationally driven about said respective rotation axes.

8. The capsule filling machine of claim 6, wherein said rotation axis of said at least one brush runs obliquely in relation to the longitudinal axis of the corresponding one of said leadthrough paths.

9. The capsule filling machine of claim 1, wherein said cleaning unit has a compressed-air feed at said leadthrough path for providing compressed air and has a compressed-air outlet for blowing out the compressed air.

10. The capsule filling machine of claim 9, wherein said compressed-air feed is configured as a gap opening at said leadthrough path.

11. The capsule filling machine of claim 1 further comprising a foreign body detection apparatus for identifying foreign bodies in the capsules.

12. The capsule filling machine of claim 11, wherein:
   said foreign body detection apparatus has, for each of said at least two processing paths of the capsule filling machine, an identification path for leading through capsules; and,
   wherein a detecting unit is provided on said identification paths.

13. The capsule filling machine of claim 11, wherein said foreign body detection apparatus is disposed downstream of said cleaning unit.

* * * * *